(12) United States Patent
Johnson et al.

(10) Patent No.: US 6,363,204 B1
(45) Date of Patent: *Mar. 26, 2002

(54) VIEWING MANAGEMENT FOR VIDEO SOURCES

(75) Inventors: Drew S. Johnson; Derrill L. Sturgeon; Christopher A. Howard, all of Houston, TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 08/940,336

(22) Filed: Sep. 30, 1997

(51) Int. Cl.$^7$ ................................................. H04N 5/91
(52) U.S. Cl. ..................... 386/46; 345/718; 386/125; 386/126; 386/68; 725/133; 725/141; 348/552
(58) Field of Search ............................... 386/1, 45–46, 386/125–126, 83, 96; 348/554–555, 559–560, 563–568, 596, 705–706, 552; 725/133, 141, 110, 112; 345/718–719; H04N 5/91

(56) References Cited

U.S. PATENT DOCUMENTS

| | | | | |
|---|---|---|---|---|
| 5,113,259 A | * | 5/1992 | Romesburg et al. | 348/565 |
| 5,128,987 A | * | 7/1992 | McDonoough et al. | 379/102.3 |
| 5,311,317 A | * | 5/1994 | Ogura et al. | 348/725 |
| 5,448,568 A | * | 9/1995 | Delpuch et al. | 348/423.1 |
| 5,485,553 A | * | 1/1996 | Kovalick et al. | 386/96 |
| 5,675,390 A | * | 10/1997 | Schindler et al. | 725/133 |
| 5,778,181 A | * | 7/1998 | Hidary et al. | 725/110 |
| 5,969,749 A | * | 10/1999 | Imaeda | 386/83 |
| 5,991,799 A | * | 11/1999 | Yen et al. | 709/218 |
| 6,002,394 A | * | 12/1999 | Schein et al. | 345/719 |
| 6,018,612 A | * | 1/2000 | Thomason et al. | 386/125 |
| 6,025,884 A | * | 2/2000 | Choi | 348/565 |
| 6,064,760 A | * | 4/2000 | Jun | 345/718 |
| 6,069,669 A | * | 5/2000 | Park et al. | 348/596 |
| 6,259,440 B1 | * | 7/2001 | Vanghan et al. | 345/721 |

OTHER PUBLICATIONS

Nilsson, Frank; "DVD–the storage medium for the future?"; Accessed Sep. 8, 1997; pp. 1–9.
DVD Frequently Asked Questions (with answers!); Accessed Jun. 18, 1997; http://www.videodiscovery.com/vdyweb/dvd/dvdfaq.html.
Parker, Dana J.; "DVD: The Update"; *CD–ROM Professional*, Aug., 1996; Accessed Sep. 8, 1997; pp. 1–10.
"Digital Video Disc: The Coming Revolution in Consumer Electronics"; *C–Cube Microsystmes*; Accessed Jun. 23, 1997; http://www.c–cube.com/technology/dvd.html.
"Toshiba SD3006 DVD Digital Video Disc Player"; Consumer Direct Warehouse; Accessed Jun. 18, 1997; http://www.consumer–direct.com/detail.com/detail.cfm?VPARTNO=SD3006&WEIGHT=9.0&Q=230.0.

* cited by examiner

Primary Examiner—Vincent F. Boccio
(74) Attorney, Agent, or Firm—Sharp, Comfort & Merrett, P.C.

(57) ABSTRACT

A system operable with a Digital Versatile/Video Disc source, provided with a scheme for preferably automatically pausing the playback of a DVD title when a user indicates that another activity is to be engaged. By automatically pausing the title playback, computational load on a processor subsystem associated with the system is minimized while graceful management of the additional video sources is effected. When the user switches to experiencing the DVD source as the primary source, the playback of the title is preferably automatically resumed.

8 Claims, 6 Drawing Sheets

VIEWING MANAGEMENT FOR VIDEO SOURCES

CROSS-REFERENCE TO RELATED APPLICATIONS

This application hereby incorporates by reference the following co-assigned patent application which describes related subject matter in greater detail: "DEVICE WITH CONVERGED FUNCTIONALITY", filed application Ser. No. 08/828,992 Mar. 31, 1997 (U.S. Pat. No. 6,259,440, issued Jul. 10, 2001); inventors: Mark P. Vaughan, Thomas J. Brase, Drew S. Johnson, Kevin J. Brusky, and Brian V. Belmont.

BACKGROUND OF THE INVENTION

1. Technical Field of the Invention

The present invention relates to control schemes usable in devices with integrated multiple functional modalities, which devices can operate, for example, with a host of audio/video sources. More particularly, the present invention is drawn to an intelligent pause and resume setting scheme preferably operable with a Digital Versatile/Video Disc (DVD) source, which source may be integrated within a convergence device system.

2. Description of Related Art

Achieving convergence of various information, entertainment and communications technologies has become a much sought-after goal. A highly visible example of this trend is the attempt to integrate computer technologies (such as, for example, personal computer technologies) with consumer/home electronics technologies (such as, for example, television technologies, video game technologies, video telephony, video/laser disc technologies, et cetera). It is hoped that one of the products of this convergence will be a single integrated device for information, entertainment and communications, which device can, at least in part, utilize the available communications bandwidth, mass storage and graphics handling capabilities of the personal computer (PC) to deliver, store and display a variety of applications so as to provide a seamlessly unified audio-visual environment to consumers.

In spite of many recent advances in this area, several problems persist. One of the more significant problems is the difficulty of providing to a consumer (alternatively, a user or viewer) means for effective yet seamless and graceful management of the display of video sequences associated with one or more video sources, preferably all in one machine, with the option of selectable video sourcing or switching. In particular, when the user experience of the video sequences is alternated between two video sources or when there is a background non-video activity with which a video-based activity is to be switched, it is generally preferable that such transitions are not only smooth and intuitively appealing, but also that they do not detrimentally affect other aspects of the user experience. It can be readily appreciated by those skilled in the art that the need to address and obviate such problems is especially pronounced in cases wherein currently available advanced storage technologies such as, for example, the Digital Versatile/Video Disc (DVD) technology, are integrated with a highly converged device that offers multiple modes of "functionalities." In simple terms, there are so many factors involved that providing easy, but effective, video program control is difficult in highly converged devices. A commonly-owned, pending U.S. patent application Ser. No. 08/828,992 entitled "DEVICE WITH CONVERGED FUNCTIONALITY", filed Mar. 31, 1997 (inventors: Mark P. Vaughan, Thomas J. Brase, Drew S. Johnson, Kevin J. Brusky, and Brian V. Belmont) describes subject matter related to such a highly converged device in greater detail and is incorporated herein by reference.

Because the teachings of the present invention are exemplified in relation to various aspects of DVD technology, particularly when integrated with a convergence device, a brief description thereof is deemed appropriate and is provided immediately hereinbelow.

The DVD technology is an advanced, digital storage technology for video, audio, data, and any combination thereof, and is centered around a new medium (a laser-readable disc) capable of storing up to about 17 Gigabytes of information. As is known in the art, the copious amount of digital information is provided on the disc in accordance with a standardized format. Analogous to current consumer electronics formats, it is useful to visualize the DVD format technology as a total system that comprises a mastering facility, a physical storage/distribution medium (the disc itself) and a player. The mastering process may typically comprise several steps which include inserting various codes for controlling the presentation of video/audio information (also known as content); compressing the raw video information into a known format (for example, the Motion Picture Experts Group-2, or, MPEG-2, format) using a process called variable bit rate encoding; compressing the audio information also into a known format such as, for example, the Dolby® AC3 Surround Sound format; and combining the compressed audio and video information into a single, encoded data stream for producing a "master" and generating copies (i.e., laser-readable discs) therefrom.

FIG. 1 depicts a block diagram of a typical DVD mastering system 100 for effectuating some of the steps described above. Inputs from a master video tape 102 and a master audio tape 104 are provided to a variable bit rate (VBR) encoder 106 and a suitable audio encoder 108, respectively. The encoders 106 and 108, in turn, are managed via content/quality control block 110 so as to provide compressed and encoded video and audio to a multiplexer/formatter 112 for generating a combined audio/video data stream. An emulator 114 is provided to simulate the playback of the data stream. A master disc 116 is then created using the "image" of the DVD data steam which may have been written to a data tape beforehand. Using replicators, a content provider may mass-produce DVD discs for market consumption by "pressing" the master 116.

The digital information on a DVD disc is organized in a well-known hierarchical file structure which allows not only a plethora of desirable features such as, for example, multiple aspect ratios, multiple language tracks and subtitles, multiple camera angles, and rudimentary forms of parental control, but also a presentation technique for allowing and facilitating user interactivity via an overlaid graphics tool, called an on-screen display (OSD) tool.

FIG. 2 depicts the block diagram of a typical DVD player 200 for the playback of a DVD disc 202. A disc reader mechanism is provided with the player 200, which mechanism comprises a motor 204 for spinning the disc 202 and a laser 206 that reads the digital information therefrom. Typically, the laser 206 is operable in the "red" portion of the visible light spectrum. A DVD-compliant digital signal processor (DSP) 208 is provided in a feedback arrangement with the disc reader mechanism for translating the laser pulses generated from the laser 206 back into electrical form.

At the heart of the player 200 is a digital audio/video (AV) decoder 210 that receives electrical signals from the DSP 208 for further processing. The AV decoder 210 comprises several important functional blocks which act on the received electrical signals at various stages of processing. The composite signal information is initially separated by a demultiplexer 212 which provides video content stream to a video decoder 214, compressed bitmaps to a subpicture processor 216, and audio content stream to an appropriate audio decoder 218. The subpicture processor 216 provides the processed subpicture information to an OSD graphics tool 220. A video multiplexer 222 controllably presents the decoded video information from the video decoder 214 and the output from the OSD graphics tool 220 to an appropriate TV signal encoder 224 (compliant with, for example, the National Television Standards Committee (NTSC) signal format, or the Phase Alternate Line (PAL) signal format), which then provides a suitable TV signal to a TV (not shown) for playback. The decoded audio information from the audio decoder 218 may be provided to an appropriate audio system which may or may not be integrated with the TV. A microcontroller 226 is provided as part of the DVD player 200 for supervising the operation thereof. As can be readily seen, the microcontroller 226 may be engaged by the user via a remote control or front panel 228 for translating user inputs into commands for the audio/video decoder 210 and/or the disc reading mechanism of the player 200.

It can be appreciated that the DVD technology comprising the DVD discs and suitable players therefor provides significant advances over conventional media for content presentation to viewers. Because of the digitization of the content and a standardized hierarchical organization thereof in a title, DVD technology offers a wide-ranging menu of choices and options to viewers. However, in some aspects, current DVD implementations may be considered rather deficient. For example, in a typical DVD arrangement, there is no provision for intelligently pausing and resuming the playback of a DVD program sequence, especially when multiple video sources are being used and switched. This deficiency arises in current implementations due, at least in part, to the manner in which a consumer electronics DVD player such as, for example, the player 200 described hereinabove, is typically configured for home entertainment. It is known that a DVD player is typically mated with a consumer electronics TV. In general, the TV has no awareness that the DVD player is providing input to the TV. Likewise, the DVD player has no awareness about what audio/video (AV) source the viewer is currently watching on the TV screen.

Accordingly, it can be readily envisioned that when the viewer desires to switch between the DVD input and the received TV signal input, there might be reduced quality associated with the viewer experience of either programming. For instance, imagine that the viewer is watching a DVD program on the primary viewing area of the display monitor. The viewer is also "monitoring" a TV program (for example, "the big game") on a secondary viewing area (for example, a picture-in-picture or "PIP" area). If a particularly exciting sequence occurs in "the big game," the viewer may want to quickly swap that sequence onto the primary area and stream the DVD input to the PIP viewing area. It can be seen that in conventional implementations the DVD player continues to stream the program sequence to the PIP area and accordingly, the viewer experience thereof is diminished to the extent when the viewer switches it back to the primary area, a certain length of the DVD program has elapsed without the viewer fully experiencing it.

Moreover, where an attempt to integrate a DVD player into a convergence-type device is to be made, additional problems may arise. For example, executing a DVD title on a convergence-type device could be computationally intensive, even when the DVD input is switched onto a PIP area or onto a partially or completely hidden window. It can be appreciated that this computational load may lead to a significant deterioration in performance that is directed to the primary viewing area or is otherwise associated with the processor controlling the convergence-type device.

Therefore, based on the foregoing, it should be understood by those skilled in the art that there is a need for a solution that addresses these shortcomings in current implementations of DVD technology. Although several DVD systems presently exist, no current system is known to have all of the advantages and novel features of the present invention, described and claimed hereinbelow, which advantageously provides a system and method for overcoming the above-mentioned deficiencies.

SUMMARY OF THE INVENTION

In one aspect, the present invention is drawn to a method of managing the viewing experience associated with two video sources, a first source for providing a first video sequence and a second source for providing a second video sequence, comprising the steps of: streaming the first video sequence onto a primary viewing surface; streaming the second video sequence onto a secondary viewing surface; routing the first video sequence to the secondary viewing surface responsive to a first input by a user, wherein the first video sequence is paused pursuant to the routing step; directing the second video sequence to the primary viewing surface; and resuming the first video sequence when the first video sequence is routed back to the primary viewing surface, responsive to a second input by the user.

In another aspect, the present invention is directed to a system for managing the viewing experience associated with two video sources, a first source for providing a first video sequence and a second source for providing a second video sequence, comprising: means for swapping the first video sequence and the second video sequence between first and second viewing surfaces responsive to a first input by a user, wherein the first video sequence is paused when swapped to the secondary viewing surface; and means for re-swapping the first video sequence and the second video sequence between the second and first viewing surfaces responsive to a second input by the user, wherein the first video sequence automatically resumes when swapped back to the primary surface.

In yet another aspect, the present invention relates to a system including a display monitor, comprising: a computer subsystem, the computer subsystem for facilitating switching between a first activity and a second activity, wherein the first activity comprises a primary experience of a user; and input means to indicate that the user desires to effectuate the second activity.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
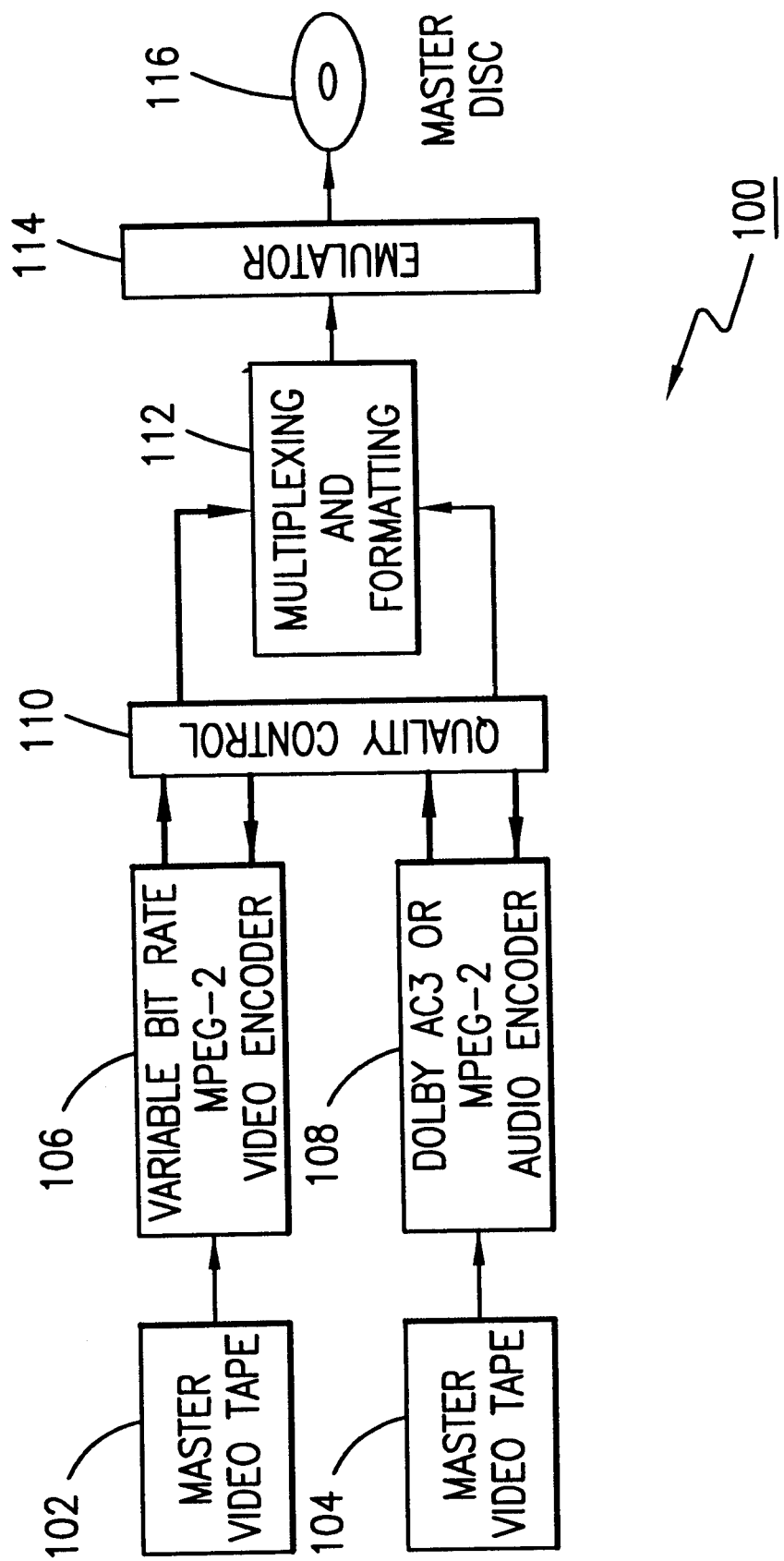
FIG. 1 illustrates a conventional DVD mastering system.
Figure 2:
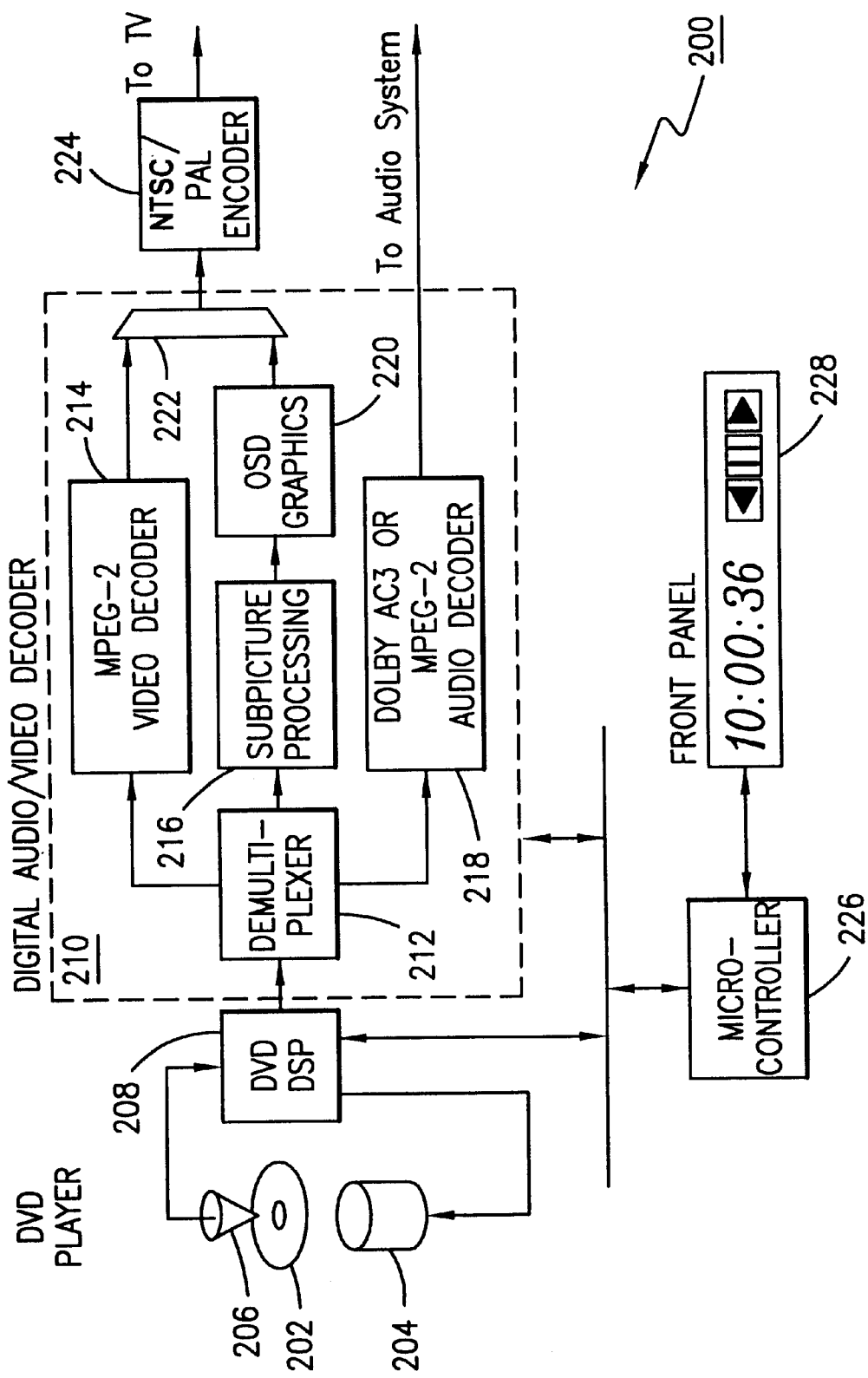
FIG. 2 depicts a block diagram of a conventional DVD player adapted for playing a DVD title.
Figure 3:
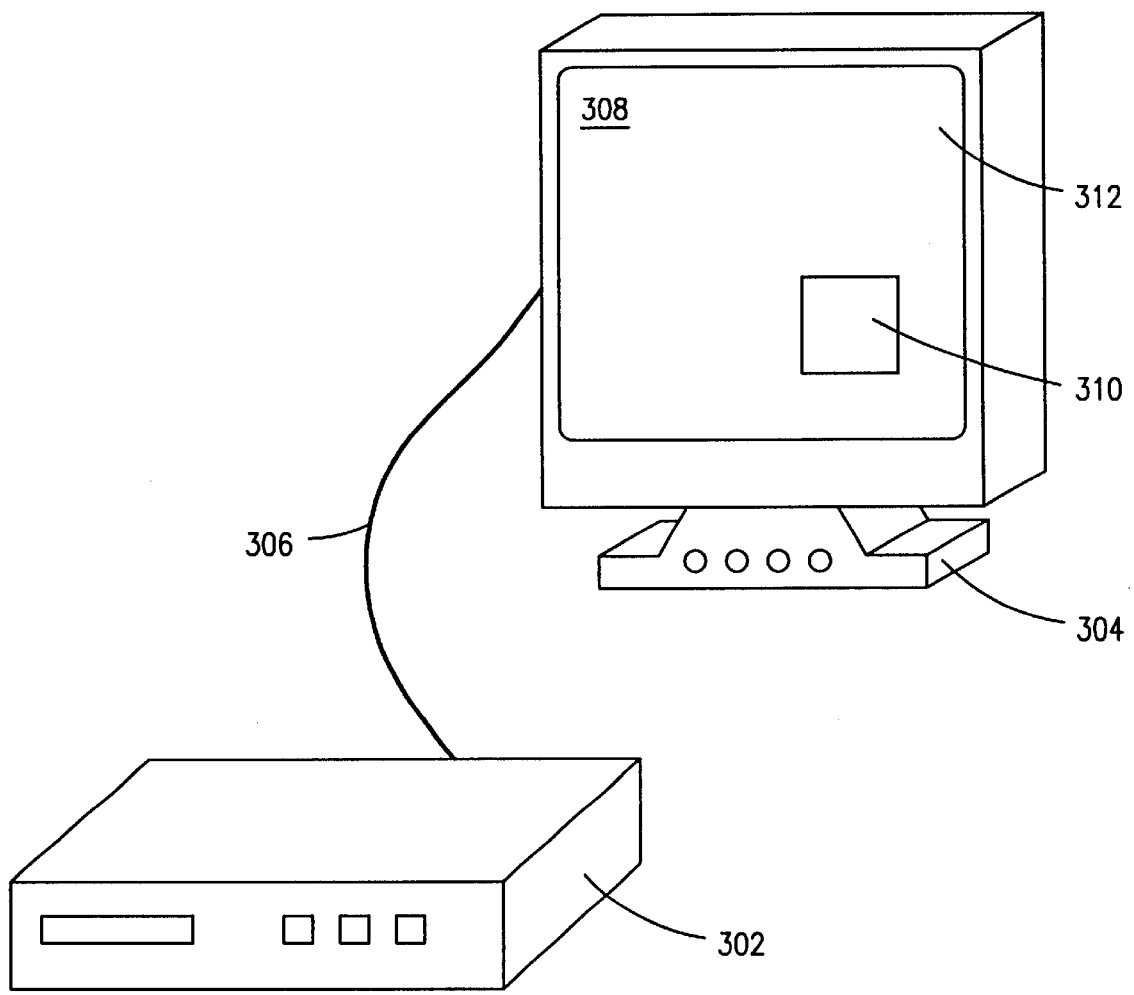
FIG. 3 depicts a typical arrangement of the DVD player with a consumer electronics television set.

Referring now to the Drawings wherein like or similar elements are designated with identical reference numerals throughout the several views, and wherein the various elements depicted are not necessarily drawn to scale, and, in particular, to FIG. 3, there is shown a typical arrangement of a DVD player 302 with a consumer electronics television set 304. A connector 306 is provided between these two components for conducting various control and data signals therebetween. The display monitor's screen 308 may be partitionable into a primary viewing surface 312 and a secondary viewing surface 310.

Figure 4:
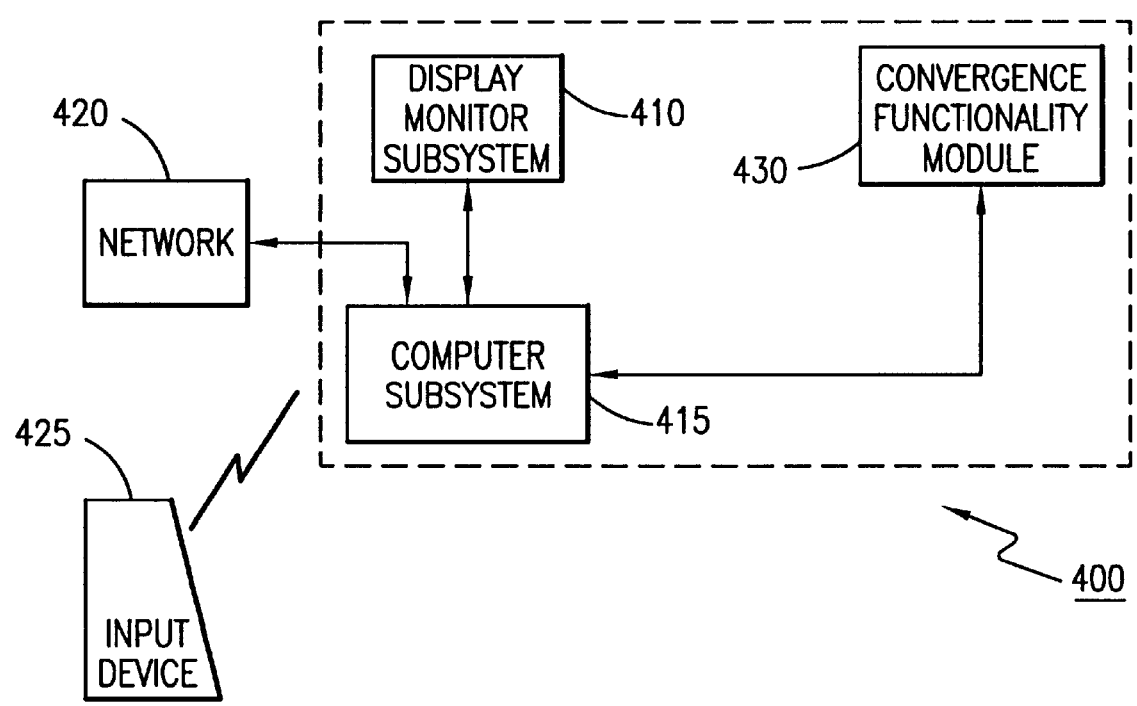
FIG. 4 depicts the block diagram of an exemplary convergence device system including a DVD source, wherein the teachings of the present invention may be utilized.

Referring now to FIG. 4, a block diagram of an exemplary convergence device system (or, an electronic convergence device) 400 is provided wherein the teachings of the present invention may be advantageously practiced. It should be appreciated by those skilled in the art that this block diagram is not necessarily intended to schematically represent specific modules of hardware or any particular data or control paths therebetween.

The convergence device system 400 includes a first subsystem, display monitor subsystem 410, operable to receive and display thereon display signals (or, indications thereof) received from a second subsystem, computer subsystem 415. Although not depicted, the subsystem 415 comprises a processor unit coupled to a storage unit, and may further preferably contain a communication port for enabling communication between the convergence device system 400 and a network 420.

Continuing to refer to FIG. 4, the network 420 can be understood to be any network, for example, a Local Area Network, a Metropolitan Area Network, a Wide Area Network, or the Internet. The computer subsystem 415 is connected to at least one convergence functionality module 430 that is adapted to receive and/or provide various combinations of composite and/or RF and/or video and/or audio and/or graphics and/or data signals. For example, the module 430 may comprise a receiver for receiving TV signals in any form, such as the NTSC form or the PAL form, via any medium, digital or analog, such as the cable system, the Digital Satellite System, or a network broadcast medium. In another embodiment, the module 430 may comprise a consumer/home electronics unit adapted to be integrated with the computer subsystem 415 in addition to a TV receiver. For example, a video gaming unit or a DVD unit may be provided such that the outputs (video, audio, or both) of the units are controlled or modulated by the computer subsystem 415. A video controller service in the subsystem 415 may be responsible for managing these outputs such that appropriately modulated (or decoded or processed) display signals (or, indications thereof) are selected to be forwarded to drive suitable output devices, for example, the display monitor subsystem 310 or an audio output device (not shown).

Although the module 430 and the subsystem 415 are shown to be two separate yet interconnected entities, the module 430 may in some embodiments of the present invention be integrated into the subsystem 415. Such an integrated subsystem may comprise in a single housing one or more video sources (or consumer/home electronics units including receivers for TV signals, gaming units, VCRs, video/laser disc units, video telephony units etc.), the video control service for managing and selecting among these sources and for generating appropriate display signals (or, indications thereof) to be provided to suitable output devices, and the processor and storage units.

Still continuing to refer to FIG. 4, the convergence device system 400 may be operable with an input device 425 which may comprise any of the following: remote control units, remote track-ball/mouse devices, remote pointing devices, wireless or wired keyboards, keyboards integrated with pointing devices, track-balls and the like. Further, although not shown in this FIG., it should also be understood that the convergence device system 400 may contain such hardware modules as one or more power units for supplying power thereto, TV tuner boards, CD-ROM players, floppy drives, printer ports, video ports, et cetera.

Due to the integration between the computer subsystem 415 and the convergence functionality module 430, it is possible to provide two "modes" of operation associated with the exemplary convergence device system 400. A first mode of operation may be referred to as a "computer" or "PC" mode wherein the system 400 is preferably experienced by a user as a computer, for example, a PC, with complete "look and feel" thereof. In this mode, the display characteristics of the display monitor associated with the system 400 may preferably be modulated so as to emulate a PC monitor. In this mode, the display monitor associated with the system 400 preferably possesses the following characteristics: underscan of the display image, disabled velocity scan modulation, a predetermined "low" value associated with contrast, brightness and color temperature settings, et cetera, as disclosed in the above mentioned U.S. Pat. No. 6,259,440. A second mode of operation may be referred to as a "non-computer" or "TV" mode wherein the user experience of the display monitor is substantially identical to that of a consumer/home electronics unit such as, for example, a TV with a DVD player coupled thereto. Further, in his mode, the display monitor associated with the system 400 may preferably possess the following characteristics: overscan of the display image, enabled velocity scan modulation, a pre-determined "high" value associated with contrast, brightness and color temperature settings et cetera, as disclosed in the above-mentioned U.S. Pat. No. 6,259,440. Accordingly, in this mode, the entire viewing area of the display monitor may be used for the viewing of an appropriate or selected video source. It should be appreciated that a video "window" may be presented on the display monitor while the convergence device system 400 is in PC mode and although that video window may be maximized to cover substantially the entire viewing area of the monitor, the system 400 is nonetheless in PC mode.

Figure 5:
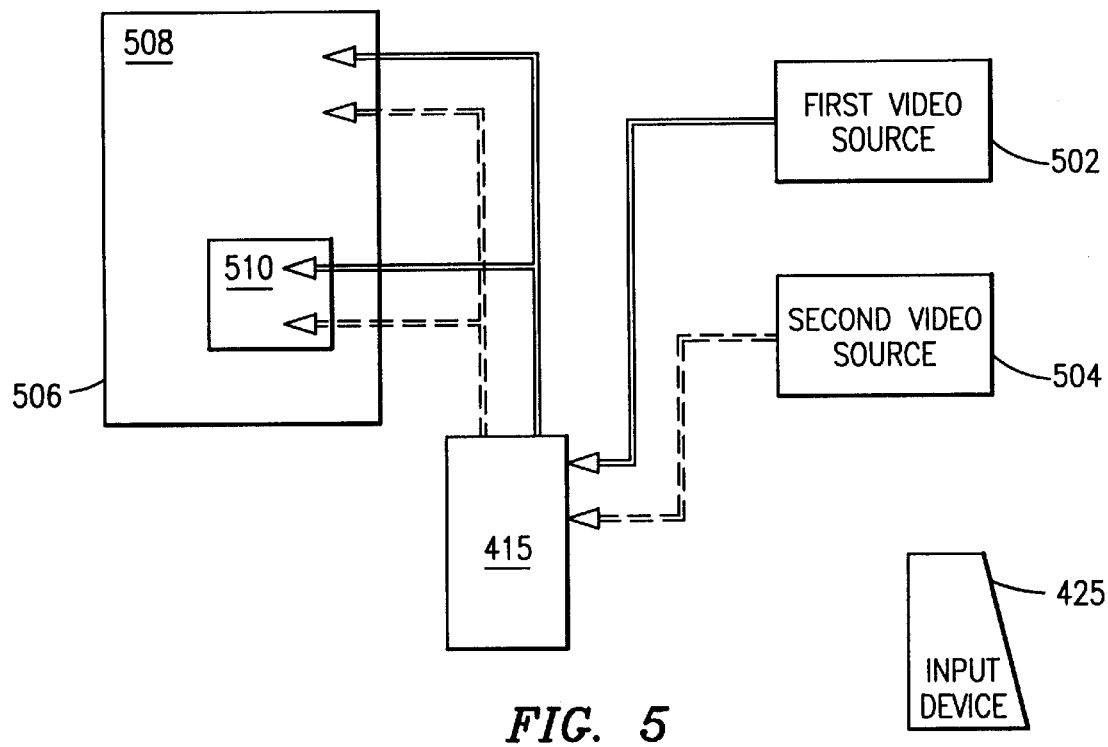
FIG. 5 depicts a functional block diagram of an embodiment of the exemplary convergence device system with two video sources provided in accordance with the teachings of the present invention.

Referring now to FIG. 5, there is shown a functional block diagram of an exemplary embodiment of a system for managing the viewing experience associated with two video sources 502 and 504 in accordance with the teachings of the present invention. The two video sources 502 and 504 provide their respective outputs to a computer-based control system such as, for example, the computer subsystem 415 of the exemplary convergence device system 400 described in the foregoing. When the convergence device system 400 is utilized in this manner, it may be preferred that it be in a non-computer or TV mode.

The computer subsystem 415 is operable with an appropriate input device such as, for example, the device 425, also described in the foregoing. Although not shown in FIG. 5, the input device 425 may comprise a keypad with appropriate keys or buttons for effectuating the novel features provided in accordance with the teachings of the present invention. A display monitor 506, which in a preferred embodiment may comprise a component of the display monitor subsystem 410 described above, is operably connected with the computer subsystem 415 for receiving appropriate video signals or sequences associated with first and second video sources 502, 504. Furthermore, the viewing area of the monitor 506 may be partitionable into a primary viewing surface 508 and a secondary viewing surface (i.e., a PIP) 510 in accordance with the TV mode of operation of the convergence device system 400.

Continuing to refer to FIG. 5, it may be realized that the video sources may comprise any two consumer/home electronics units. In an exemplary embodiment, one of the video sources may comprise a DVD player while the other source may comprise a TV receiver. In accordance with the teachings of the present invention, the computer subsystem 415 is operable to stream the DVD video sequence to the primary viewing area 508 and the non-DVD video sequence to the secondary viewing area 510. Responsive to an input or command by a user, effectuated via the input device 425, the computer subsystem 415 swaps the two video sequences between the two viewing areas such that the exemplary DVD video sequence is now displayed on the secondary viewing area 510 while the exemplary non-DVD video sequence is routed to the primary viewing area 508. In accordance with the teachings of the present invention, pursuant to this swapping, the DVD video sequence is automatically paused while it is routed to the secondary viewing area 510. The viewer is accordingly exposed to a fuller and richer viewing experience of the non-DVD video sequence routed now to the primary viewing area 508 while, at the same time, the playback position of the DVD video sequence is preserved for future viewing. Thus, when the viewer inputs another command through the input device 425 for swapping back the DVD video sequence to the primary viewing area or surface 508, the computer subsystem 415 (or, a suitable video switch control circuitry associated therewith) directs the DVD video sequence thereto and, preferably, automatically resumes the playback streaming thereof.

It should now be apparent to those skilled in the art that the teachings disclosed in the foregoing provide a novel and very desirable improvement over current DVD implementations. In addition, favorable results have been obtained utilizing the teachings of the present invention by lessening the computational loads associated with non-paused streaming of DVD playback in the PIP area of an integrated device such as the exemplary convergence device system 400.

Figure 6:
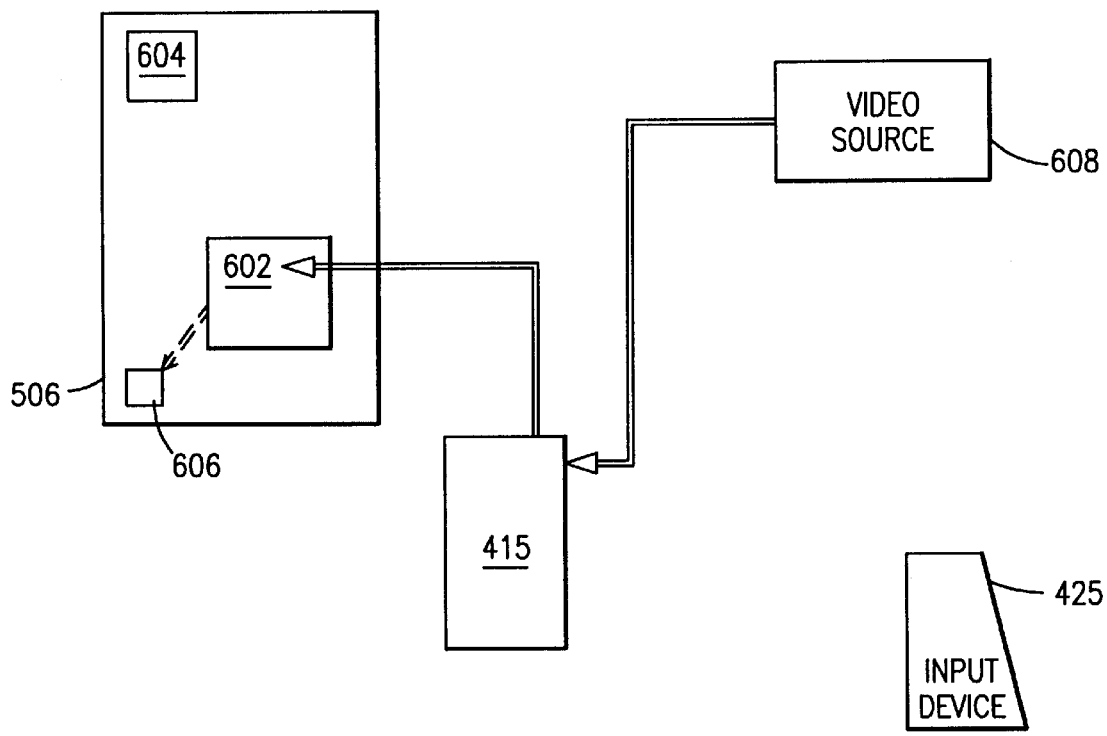
FIG. 6 depicts a functional block diagram of another embodiment of the exemplary convergence device system with a single video source provided in accordance with the teachings of the present invention.

Referring now to FIG. 6, depicted therein is a functional block diagram of another exemplary embodiment of the convergence device system 400 utilizing the teachings of the present invention. Those of ordinary skill in the art should readily appreciate that in this embodiment, the convergence device system 400 is rendered operable in PC mode such that the display monitor 506 is driven by suitable display signals provided by the computer subsystem 415. In accordance with the PC modal experience, the viewing area of the display monitor 506 may comprise a video window portion 602 and a non-video window portion 604. A video source 608, which can be a DVD source or any other consumer electronics unit, provides an appropriate video sequence to the computer subsystem 415 (or, to suitable video switch control circuitry associated therewith) such that it is directed to the video window portion 602 when the window portion is in focus.

Continuing to refer to FIG. 6, based on a user input through the input device 425, the video window portion 602 may be minimized to a graphic icon 606 on the viewing area of the display monitor 506. Pursuant to this minimization step, the processed video sequence being provided to the display monitor 506 is automatically paused in accordance with the teachings of the present invention. The user is then able to interact with any computer process that may be brought to focus via conventional computer commands. For example, the user may initiate an electronic mail (e-mail) process or launch an Internet browser in the non-video window portion 604 while the video window portion 602 is minimized to the icon 606. Once again, because of the automatic pausing of the processed video sequence associated with the video source 608, the computational loads on the computer subsystem 415 are significantly reduced. Further, when the user maximizes the icon 606 and brings the video window portion 602 back into focus, the processed video sequence is preferably automatically resumed in order to present a graceful transition to the video experience.

Figure 7:
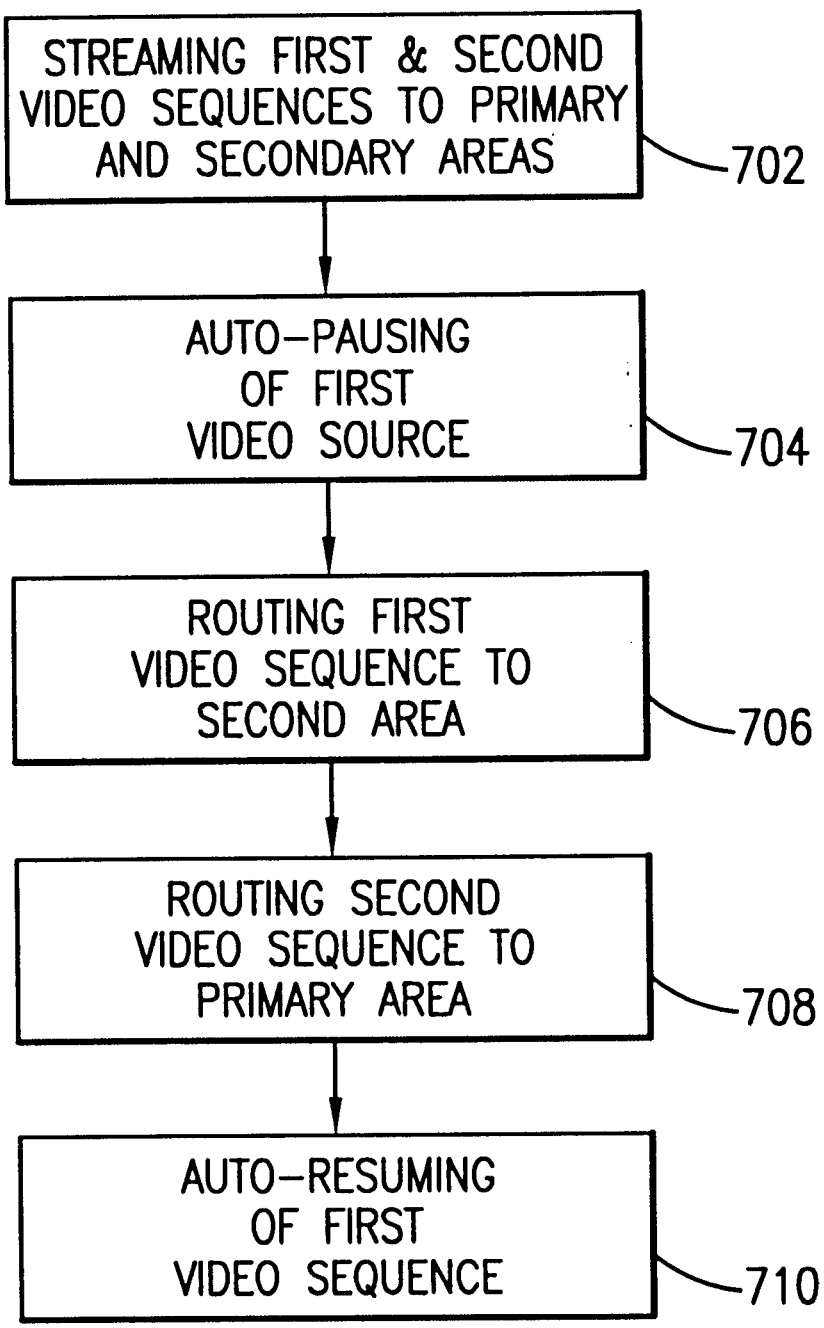
FIG. 7 illustrates a flow diagram for managing the viewing experience associated with two video sources in accordance with the teachings of the present invention.

Referring now to FIG. 7, a flow diagram illustrating the steps for an exemplary method for managing the viewing experience associated with two video sources is provided. It should be understood that these steps may be preferably performed in the exemplary convergence device system 400 as described in reference to FIG. 5, although the teachings herein may be practiced in other consumer/home electronics arrangements in which a processing unit and associated video switch control circuitry are utilized.

As provided in step 702, the video sequences from two video sources are ordinarily streamed to two different viewing areas. When the viewer swaps the video sequences between these two areas, the first video sequence, provided heretofore to the primary viewing area, is preferably automatically paused and routed to the secondary viewing area, as indicated in steps 704 and 706. The second video sequence is then directed to the primary viewing area (step 708) for facilitating a richer and fuller video experience associated therewith. The viewer may re-swap the video sequences so that when the first video sequence is redirected to the primary viewing area, it is prefereably automatically resumed (step 710).

Based on the foregoing Detailed Description, it should now be apparent to those skilled in the art that the intelligent pausing and resuming schemes provided in accordance with the teachings of the present invention offer significant improvements over current AV device arrangements while simultaneously maximizing processor-related performance in convergence-type devices. The present invention advantageously provides a system and method for intelligently operating upon an indication by a user that the user is desirous of switching to non-video activity from video-based activity whereby graceful management of display images is effectuated.

Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, even in arrangements where there is no secondary viewing area, it is within the scope of the present invention to intelligently swap between two video sources, a particular source being displayed in the entire viewing area at a time, by preferably automatically pausing and resuming pursuant to swapping. It is also possible to not automatically pause when the DVD source is not in the primary viewing area, for example, when the DVD source is to be taped in the background while other video or PC-related activity is taking place. In addition, as a variation of the exemplary embodiment described in reference to FIG. 6, a video sequence may be automatically paused whenever the video window portion is substantially covered by another application window in the PC mode. It should also be realized that the teachings of the present invention may be practiced with other AV devices. For example, in an arrangement including an audio compact disc (CD) player and speaker phone, the user can automatically pause the audio CD while a phone call is being handled.

Moreover, it should be understood by those of ordinary skill in the art upon reference hereto that the teachings contained herein may also be advantageously practiced in a computer with suitable audio/video expansion or adapter card/s and audio/video switch circuitry. Accordingly, it is envisaged that these and other numerous modifications are within the ambit of the present invention, limited solely by the following claims.

What is claimed is:

1. A computer convergence system operable to provide personal computer mode functions and operable to provide TV mode functions, said system comprising:

a convergence functionality device operable to generate TV mode function signals;

a computer subsystem coupled to said convergence functionality device to receive and manage said TV mode function signals, said computer subsystem operable under control of an operating system to execute user selectable personal computer programs and to generate personal computer mode function signals;

a display monitor having a first full screen image viewing surface and a second image viewing surface, said second viewing surface having a smaller area than and located within the area of said first viewing surface;

said computer subsystem operable to control selective display of images on said first and second viewing surfaces of said monitor;

said computer subsystem operably responsive to user commands from a user input device;

said display monitor operable in a personal computer mode to receive said personal computer mode function signals and to generate a full screen display having characteristics emulating a PC monitor display, and at the same time to generate a display from a video source on said second viewing surface; said computer subsystem operable to minimize said second viewing surface and to pause said display from said video source, and subsequently to maximize said second viewing surface and to resume said display from said video source;

said display monitor operable in a TV mode:
to receive TV mode function, signals from the convergence functionality device originating from a first video source operable to stream a recorded first video sequence to said computer subsystem, to provide a user selectable full screen over scan mode display of said recorded first video sequence on the first viewing surface of said display monitor;

said display monitor also operable in said TV display mode to receive TV mode function signals from the convergence functionality device originating from a second video source operable to stream a second video sequence to said computer subsystem to generate simultaneously with said full screen display of said recorded first video sequence, a user selectable, viewable display of said second video sequence on said second viewing surface;

said computer subsystem operable in said TV display mode in response to a command from said user input device to swap said displays on said first and second viewing surfaces, displaying said recorded first video sequence stream on said second viewing surface and generating a full screen user viewable display of second video sequence stream on said first viewing surface, and to pause said recorded first video sequence at a playback position;

said computer subsystem also operable in said TV mode in response to a command to re-swap said paused, recorded first video sequence from said second viewing surface and to resume user viewable full screen display of said recorded first video sequence stream commencing at said playback position.

2. The computer convergence device of claim 1, wherein said first video source operable to stream recorded video sequences to said computer subsystem comprises a DVD player.

3. The computer convergence device of claim 1, wherein said second video source operable to stream video sequences to said computer subsystem comprises a TV receiver.

4. The computer convergence device of claim 1, wherein said first video source operable to stream recorded video sequences to said computer subsystem comprises a DVD player, and wherein said second video source operable to stream video sequences to said computer subsystem comprises a TV receiver.

5. The computer convergence device of claim 1, wherein said user viewable full screen display of said recorded first video sequence stream resumes automatically commencing at said playback position following said reswap command.

6. The computer convergence device of claim 1, wherein said reswap command is generated in response to operation of said user input device.

7. The computer convergence device of claim 1, wherein said computer subsystem is further operable to access to a communications network.

8. A computer convergence system operable to provide personal computer mode functions and operable to provide TV mode functions, said system comprising:

a convergence functionality device operable to generate TV mode function signals;

a computer subsystem coupled to said convergence functionality device to receive and manage said TV mode function signals, said computer subsystem operable under control of an operating system to execute user selectable personal computer programs and to generate personal computer mode function signals;

a display monitor having a first full screen image viewing surface and a second image viewing surface, said second viewing surface having a smaller area than and located within the area of said first viewing surface;

said computer subsystem operable to control selective display of images on said first and second viewing surfaces of said monitor;

said computer subsystem operably responsive to user commands from a user input device;

said display monitor operable in a personal computer mode to receive said personal computer mode function signals and to generate a full screen display having characteristics emulating a PC monitor display, and at the same time to generate a display from a video source in said second viewing surface; said computer subsystem operable to minimize said second viewing surface and to pause said display from said video source, and subsequently to maximize said second viewing surface and to resume said display from said video source;

said display monitor operable in a TV mode:
to receive said TV mode function signals from the convergence functionality device a recorded first video sequence to said computer subsystem originating from a DVD video source, to provide a user selectable full screen over scan mode display of said recorded first video sequence on the first viewing surface of said display monitor;

said display monitor also operable in said TV display mode to receive TV mode function signals from the convergence functionality device originating from a TV receiver source to generate simultaneously with said full screen display of said recorded first video sequence, a user selectable, viewable display on said second viewing surface generated by video signals from said TV receiver source;

said computer subsystem operable in said TV display mode in response to a command from said user input device to swap said displays on said first and second viewing surfaces, displaying said recorded first video sequence stream on said second viewing surface and providing a full screen user viewable display on said first viewing surface, generated by said video signals from the TV receiver, and automatically to pause said recorded first video sequence at a playback position;

said computer subsystem also operable in said TV mode in response to a command to re-swap said paused, recorded first video sequence from said second viewing surface and automatically to resume user viewable full screen display of said recorded first video sequence stream commencing at said playback position.

* * * * *